US010997455B2

(12) United States Patent
Kim et al.

(10) Patent No.: US 10,997,455 B2
(45) Date of Patent: May 4, 2021

(54) APPARATUS AND METHOD OF CORRECTING 3D IMAGE DISTORTION

(71) Applicant: Electronics and Telecommunications Research Institute, Daejeon (KR)

(72) Inventors: Joon Soo Kim, Seoul (KR); Gwang Soon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 106 days.

(21) Appl. No.: 16/383,840

(22) Filed: Apr. 15, 2019

(65) Prior Publication Data

US 2019/0332882 A1 Oct. 31, 2019

(30) Foreign Application Priority Data

Apr. 26, 2018 (KR) .................. 10-2018-0048401

(51) Int. Cl.
*G06K 9/40* (2006.01)
*G06T 5/00* (2006.01)

(52) U.S. Cl.
CPC .............. *G06K 9/40* (2013.01); *G06T 5/006* (2013.01)

(58) Field of Classification Search
CPC .................. G06T 7/001; G06T 7/74; G06T 2207/30141; G06T 2207/20104; G06T 2207/20081; G06K 9/6254; G06K 9/3233; G06K 9/6202; G06K 9/6256
See application file for complete search history.

(56) References Cited

U.S. PATENT DOCUMENTS

| | | | |
|---|---|---|---|
| 10,075,703 B2 | 9/2018 | Song | |
| 2005/0100245 A1* | 5/2005 | Chen | G06T 5/006 382/294 |
| 2010/0177973 A1* | 7/2010 | Wedi | H04N 19/80 382/233 |
| 2015/0002625 A1 | 1/2015 | Lee et al. | |
| 2016/0150223 A1* | 5/2016 | Hwang | H04N 13/327 348/51 |
| 2017/0147609 A1* | 5/2017 | Lin | G06K 9/6215 |
| 2017/0302912 A1 | 10/2017 | Eum et al. | |
| 2018/0136478 A1* | 5/2018 | Bae | G02B 30/00 |
| 2019/0385285 A1* | 12/2019 | Chen | G06T 5/006 |
| 2020/0019921 A1* | 1/2020 | Buibas | G06K 9/00362 |

FOREIGN PATENT DOCUMENTS

| | | |
|---|---|---|
| JP | 2005149500 A | 6/2005 |
| KR | 100668073 B1 | 1/2007 |
| KR | 1020160061827 A | 6/2016 |
| KR | 1020160100687 A | 8/2016 |
| KR | 101663672 B1 | 10/2016 |
| KR | 1020170017586 A | 2/2017 |
| KR | 1020170089744 A | 8/2017 |
| KR | 101808758 B1 | 12/2017 |

* cited by examiner

*Primary Examiner* — Nizar N Sivji
(74) *Attorney, Agent, or Firm* — William Park & Associates Ltd.

(57) ABSTRACT

Disclosed is an apparatus and method of correcting 3D image distortion. A method of correcting 3D image distortion according to the present disclosure includes: receiving an input image that contains a predetermined first pattern; extracting a characteristic value related to the first pattern from the input image; and updating the input image on the basis of the extracted characteristic value.

14 Claims, 6 Drawing Sheets

APPARATUS AND METHOD OF CORRECTING 3D IMAGE DISTORTION

CROSS REFERENCE TO RELATED APPLICATION

The present application claims priority to Korean Patent Application No. 10-2018-0048401, filed Apr. 26, 2018, the entire contents of which is incorporated herein for all purposes by this reference.

BACKGROUND OF THE INVENTION

Field of the Invention

The present disclosure relates generally to an apparatus and a method of correcting 3D image distortion. More particularly, the present disclosure relates to an apparatus and a method of correcting 3D image distortion on the basis of a linear matching error correction technique.

Description of the Related Art

Generally, a 3D image display device provides a three-dimensional effect of an object by using binocular parallax. The binocular parallax may occur when a left-eye image and a right-eye image are separately provided as left and right images for the user. The 3D image display device is the device that artificially generates parallax for the user's left and right eyes, such that two images with parallax are respectively provided to the left and right eyes. After the brain processes the different images viewed by the left and right eyes, and creates a sense of viewing a real 3D object.

Examples of this 3D image display device include a glasses (stereoscopic) type and a glasses-free (autostereoscopic) type according to whether glasses are worn. In the case of the glasses type 3D image display device, a polarized method, a time division method, and the like are used. In order to view 3D images, it is necessary to wear a particular tool, such as polarized glasses, which is inconvenient. In contrast, the glasses-free type 3D image display device solves the inconvenience of the glasses type 3D image display device and is able to separate the left-eye image and the right-eye image using a 3D optical plate or an optical layer, such as a parallax barrier, lenticular lens, or the like, that is placed in front of display panel. Accordingly, the viewer is able to view 3D images without any particular tools.

However, in the case of the glasses-free type 3D image display device, there is a problem in that 3D images are distorted due to an error in an optical layer process, misalignment in a layer boding process, an error in distance between layers, or change caused by temperature or external force.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is intended to propose an apparatus and a method of correcting 3D image distortion.

Also, the present disclosure is intended to propose an apparatus and a method of correcting 3D image distortion on the basis of a linear matching error correction technique.

It is to be understood that technical problems to be solved by the present disclosure are not limited to the aforementioned technical problems and other technical problems which are not mentioned will be apparent from the following description to a person with an ordinary skill in the art to which the present disclosure pertains.

According to one aspect of the present disclosure, there is provided a method of correcting 3D image distortion, the method including: receiving an input image that contains a predetermined first pattern; extracting a characteristic value related to the first pattern from the input image; and updating the input image on the basis of the extracted characteristic value.

According to another aspect of the present disclosure, there is provided an apparatus for correcting 3D image distortion, the apparatus including: an input unit receiving an input image that contains a predetermined first pattern; a storage unit storing a characteristic value related to the first pattern; and a control unit extracting the characteristic value from the input image and updating the input image on the basis of the extracted characteristic value.

It is to be understood that the foregoing summarized features are exemplary aspects of the following detailed description of the present disclosure without limiting the scope of the present disclosure.

According to the present disclosure, an apparatus and a method of correcting 3D image distortion are provided.

Also, according to the present disclosure, the apparatus and the method of correcting 3D image distortion on the basis of the linear matching error correction technique are provided.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Figure 1:
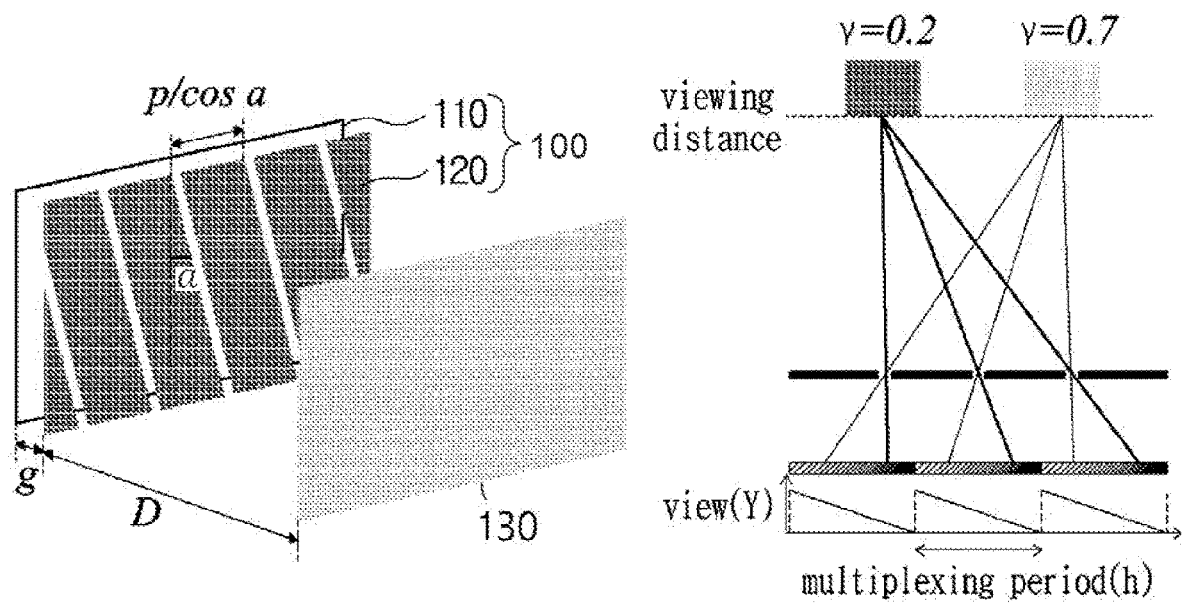
FIG. 1 is a diagram illustrating a multi-view image display device that supports horizontal parallax according to an embodiment of the present disclosure.

Hereinbelow, exemplary embodiments of the present disclosure will be described in detail such that the ordinarily skilled in the art would easily understand and implement an apparatus and a method provided by the present disclosure in conjunction with the accompanying drawings. However, the present disclosure may be embodied in various forms and the scope of the present disclosure should not be construed as being limited to the exemplary embodiments.

In describing embodiments of the present disclosure, well-known functions or constructions will not be described in detail when they may obscure the spirit of the present disclosure. Further, parts not related to description of the present disclosure are not shown in the drawings and like reference numerals are given to like components.

In the present disclosure, it will be understood that when an element is referred to as being "connected to", "coupled to", or "combined with" another element, it can be directly connected or coupled to or combined with the another element or intervening elements may be present therebetween. It will be further understood that the terms "comprises", "includes", "have", etc. when used in the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms "first", "second", etc. may be used herein to describe various elements, these elements should not be limited by these terms. These terms are only used to distinguish one element from another element and not used to show order or priority among elements. For instance, a first element discussed below could be termed a second element without departing from the teachings of the present disclosure. Similarly, the second element could also be termed as the first element.

In the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the scope of the present disclosure.

In the present disclosure, all of the constituent elements described in various embodiments should not be construed as being essential elements but some of the constituent elements may be optional elements. Accordingly, embodiments configured by respective subsets of constituent elements in a certain embodiment also may fall within the scope of the present disclosure. In addition, embodiments configured by adding one or more elements to various elements also may fall within the scope of the present disclosure.

Herein below, exemplary embodiments of the present disclosure will be described with reference to the accompanying drawings.

FIG. 1 is a diagram illustrating a multi-view image display device that supports horizontal parallax according to an embodiment of the present disclosure.

Referring to FIG. 1, the multi-view image display device 100 may include a display panel 110 and/or an optical layer 120. When placing the optical layer 120, such as a lens array, a parallax barrier, or the like, on the display panel 110, different images are viewed depending on the position on a viewing distance plane 130. For example, the viewing distance plane 130 may be an optimum viewing distance plane that corresponds to an optimum viewing distance at which the viewer views 3D images. Examples of the display panel 110 may include a flat panel display. Therefore, images are displayed on the display panel 110 in such a manner that the observer positioned on the viewing distance plane 130 views the view image at which time a 3D object is observed at the relevant position, such that 3D images with the three-dimensional effect are provided to the viewer.

Referring to FIG. 1, the multi-view image display device 100 that supports horizontal parallax may display different images according to the position. The optical layer 120 has a one-dimensional period and may generally be designed in such a manner that the direction in which repetition occurs is tilted at a tilt angle α with respect to the pixel array of the display panel 110. The tilt angle is required to be designed to an appropriate value considering the pixel structure of the display panel 110. The reason for considering the tilt angle is to avoid degradation of image quality caused by a Moire phenomenon. When the horizontal period of the optical layer 120 and an effective distance between two layers considering refraction are uniformly p/cos(a) and g, respectively, and the viewing distance D is determined, a function, such as Equation 1, is defined on the plane of the display panel 110.

$$\gamma(x, y) = \frac{x - y\tan\alpha}{h} \mod 1, \qquad \text{[Equation 1]}$$

Referring to Equation 1, h which is a multiplexing period is defined as $(1+g/D)\cdot p/\cos(\alpha)$. Referring to FIG. 1, when viewing the image display device 100 at an arbitrary position on the viewing distance plane 130, it is found that only pixels having the same values of γ(x, y) are visible. Accordingly, the display place is divided according to the value of γ(x, y), and the each function value is covered with the corresponding view image so as to generate a spatially multiplexed image. When the spatially multiplexed image is displayed on the image display device 100, the view images corresponding to respective views are viewed.

In the meantime, in the case where the tilt angle α and the multiplexing period h are inaccurate, when the image display device 100 is watched from the viewing distance plane 130, due to the difference between the function γ(x, y) and the function used in image multiplexing in practice, pixels having different values of γ(x, y) are simultaneously observed, so that a phenomenon that view images are mixed may occur. This error may be caused by an error in an optical layer process, misalignment in a layer bonding process, an error in distance between layers, and change due to temperature/external force. If the period of the optical layer and the distance between two layers are completely uniform so that the mismatch is only due to the error in the global multiplexing period and the error in the tilt angle, the error distribution of the function γ(x, y) is expressed by the errors in the multiplexing parameters in Equation 1. If not, for a limited area, linear approximation is performed on the error distribution of the function γ(x, y) so as to correspond to the errors in the multiplexing parameters. The multiplexing parameters may include information on a cross-eyed placement period or information on a cross-eyed placement direction of the view images. The information on the cross-eyed placement period or on the cross-eyed placement direction of the image may mean information required to obtain the 3D image by combining the view images, for example, placing the view images in a cross-eyed manner. For example, the multiplexing parameters may include the tilt angle α and/or the multiplexing period h. The process of eliminating the distortion of the 3D image by measuring the error in the tilt angle α and/or the multiplexing period h, which are the multiplexing parameters as described above, and by applying the result of the measurement to the multiplexed image so as to regenerate a multiplexed image is called a linear matching error correction technique.

One of the recent linear matching error correction techniques is a method of analyzing, in a spatial frequency domain, a grid image that appears when a periodic vertical line pattern is viewed through the optical layer. According to this method, theoretically, the linear matching error correction is possible to the optimum level. In simulation, it is known that the method is about 10 times more accurate than the conventional linear matching error correction method and is resistant against image noise. However, in practice, when trying extracting spatial frequency components for the image display device, it is difficult to measure the spatial frequency accurately due to the limitation of the resolution of the measurement camera, the enlarged peak, and the like. Further, a quantitative accuracy assessment method is generally not well known, so that it is common to only check whether the image quality is improved. Therefore, there is a problem that it is difficult for the conventional linear matching error correction method to guarantee the sufficient accuracy of the result of the 3D image in practice. Thus, the system for correcting 3D image distortion of the present disclosure provides a method of correcting the distortion of the 3D image, which occurs due to disagreement between the design and the arrangement of the display panel and the optical layer for generating a multi-view visual field. The correction means correction in a software manner rather than physical rearrangement of the layers.

Figure 2:
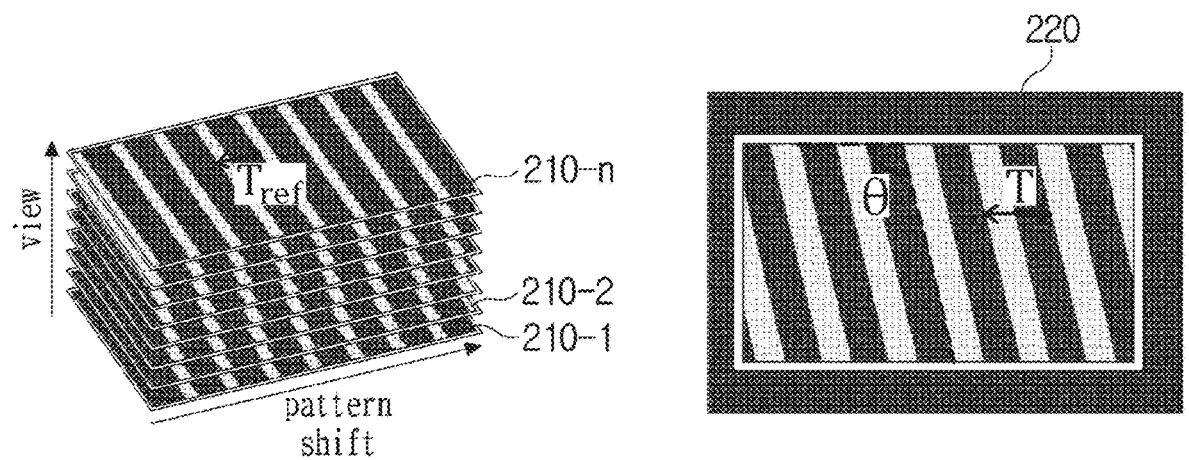
FIG. 2 is a diagram illustrating generation of a test pattern image for measuring a linear matching error and extraction of characteristic value according to an embodiment of the present disclosure.

FIG. 2 is a diagram illustrating generation of a test pattern image for measuring a linear matching error and extraction of characteristic value according to an embodiment of the present disclosure.

The test pattern for measuring the linear matching error of the present disclosure may be generated from a preset view image group. The view images may have a cyclic characteristic where gradual alteration takes place as the view moves and when additional alteration takes place at the last view by the distance corresponding to one view interval, returning back to the first view image takes place. Each view image is required to have a characteristic distinguishable from adjacent views. Preferably, for example, a change in characteristic between view images is a gradual change indicating a single trend. The multiplexed image is generated using the view image group and the tilt angle α and/or the multiplexing period h which are the multiplexing parameters out of true values. In the meantime, when viewing the multiplexed image displayed on the display panel through the optical layer, the altered pattern shape of the view image is observed. When extracting two or more characteristic values that characterize the alteration of the view image, the extracted characteristic values are used to estimate errors in the two multiplexing parameters a and h. For example, the characteristic value may be the length or slope of the altered pattern. The shape of the test pattern generated using a relatively simple cyclic view image group and extraction of the characteristic value will be described with reference to FIG. 2.

Referring to FIG. 2, each of the view images 210-1, . . . , and 210-n (n is an integer or one or more) has a pattern of stripes at intervals of a reference period $T_{ref}$, and the slope or color of the stripes may be selected considering the pixel structure of the display. For example, assuming a normal panel in the RGB stripe shape, the red vertical stripe may be selected as the view image. The period may be set in such a manner that as the view moves, the stripes are shifted in parallel to the direction in which the pattern is repeated and when the last view image 210-n is further shifted in parallel by the distance corresponding to one view interval, the first view image 210-1 is reached. This view image list and the tilt angle α and/or the multiplexing period h, which are the multiplexing parameters slightly out of the true values, are used to generate the multiplexed image. When viewing the multiplexed image displayed on the display panel through the optical layer, an image 220 in an altered periodic stripe shape is obtained in general. The apparatus for correcting 3D image distortion of the present disclosure may use the image having the altered pattern of stripes as a test pattern image. The characteristic value of the test pattern is a variable indicating the characteristic of the test pattern image, and the degree of the alteration in the view image may be applied to the characteristic value. Accordingly, by extracting and using the characteristic value, the errors in the multiplexing parameters of the view image may be predicted. For example, examples of the characteristic value include the horizontal period T of the stripe and/or the slope θ of the stripe in the test pattern image. Also, for example, the horizontal period T of the stripe and/or the slope θ of the stripe may be expressed as Equations 2 and 3, respectively, using the errors in the multiplexing period h and/or the tilt angle α that are the multiplexing parameters.

$$T = \frac{T_{ref}}{1 - \frac{T_{ref}}{h}\frac{\delta h}{1+\delta h}}, \qquad [\text{Equation 2}]$$

$$\tan\left(\theta - \frac{\pi}{2}\right) = \frac{T_{ref}}{h}\frac{\Delta A - A\delta h}{1 + \left(1 - \frac{T_{ref}}{h}\right)\delta h}, \qquad [\text{Equation 3}]$$

Referring to Equations 2 and 3, the multiplexing period and a multiplexing period error rate Δh/h are designated by h and δh, respectively. The tan (θ) and the error Δ(tan (θ)) are designated by A and ΔA, respectively. For example, when T and reach $T_{ref}$ and π/2, respectively, by adjusting the multiplexing parameters, δh and ΔA reach zero, thereby obtaining the true values of the multiplexing parameters. The characteristic value T and/or θ in the test pattern may be obtained using a general corner search algorithm, a Homography transformation or Hough transform-based line search algorithm, and the like. Also, in order to obtain T and/or θ according to the observation condition, a noise reduction filter or a low-pass filter may be applied.

Figure 3:
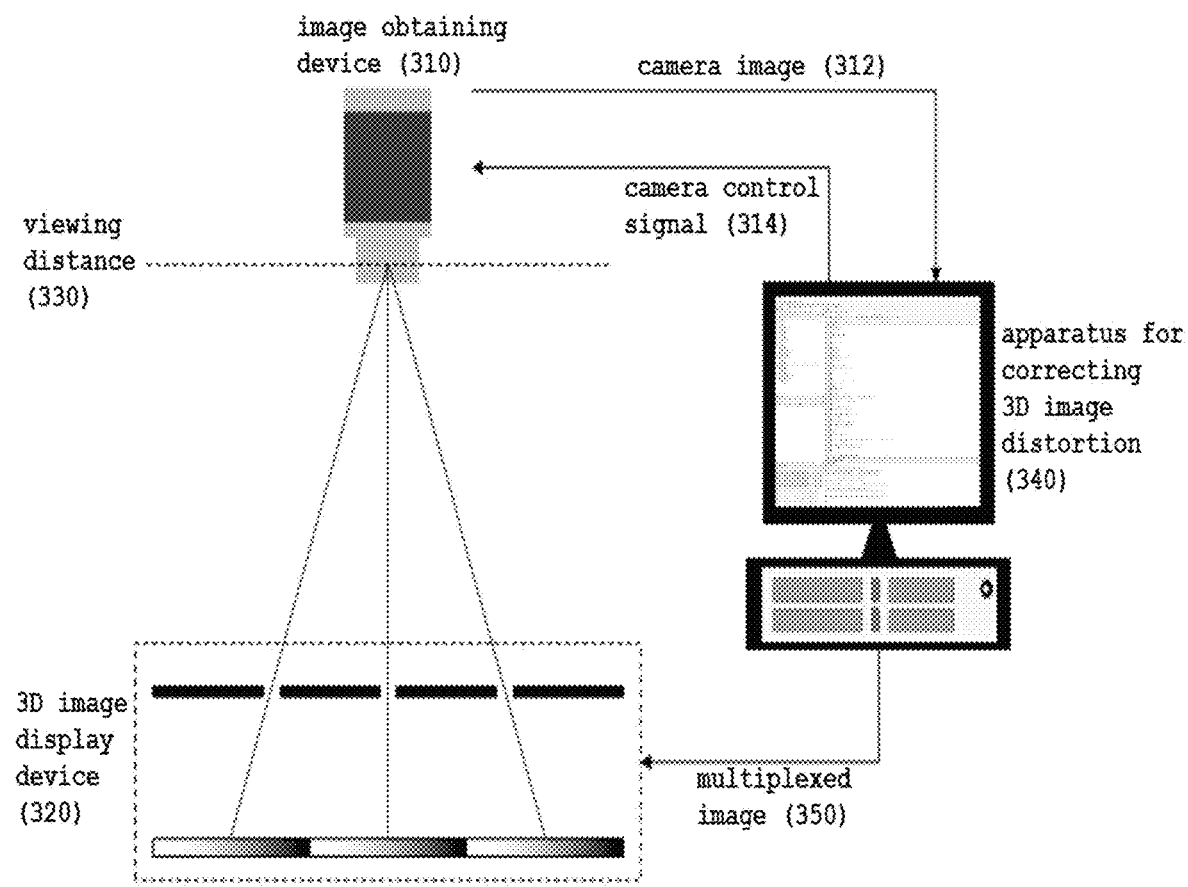
FIG. 3 is a diagram illustrating a system for correcting 3D image distortion according to an embodiment of the present disclosure.

FIG. 3 is a diagram illustrating a system for correcting 3D image distortion according to an embodiment of the present disclosure.

Referring to FIG. 3, the system for correcting 3D image distortion may perform monitoring of the test pattern image and repeated correction. For example, an image obtaining device 310 is placed at an arbitrary position within the main visual field of a 3D image display device 320 and is placed in such a manner that the nodal point of the camera lens is positioned at a viewing distance 330. The viewing distance 330 may mean the optimum viewing distance at which the viewer views 3D images. Also, for example, the resolution of a camera image 312 may be high enough to detect the value several times greater than the spatial frequency $1/T_{ref}$ but not so high to hinder the operation speed. An apparatus 340 for correcting 3D image distortion receives the camera image 312 from the image obtaining device 310 and extracts the characteristic value of the test pattern. When the characteristic value is not close enough to a target value, the apparatus 340 for correcting 3D image distortion updates a multiplexed image 350 and transmits the result to the 3D image display device 320. Each time the multiplexed image 350 is updated, the apparatus 340 for correcting 3D image distortion may transmit a camera control signal 314 to the image obtaining device 310. Also, the apparatus 340 for correcting 3D image distortion may monitor the result of updating the multiplexed image 350 by capturing the camera images 312 that are sequentially input from the image obtaining device 310.

Figure 4:
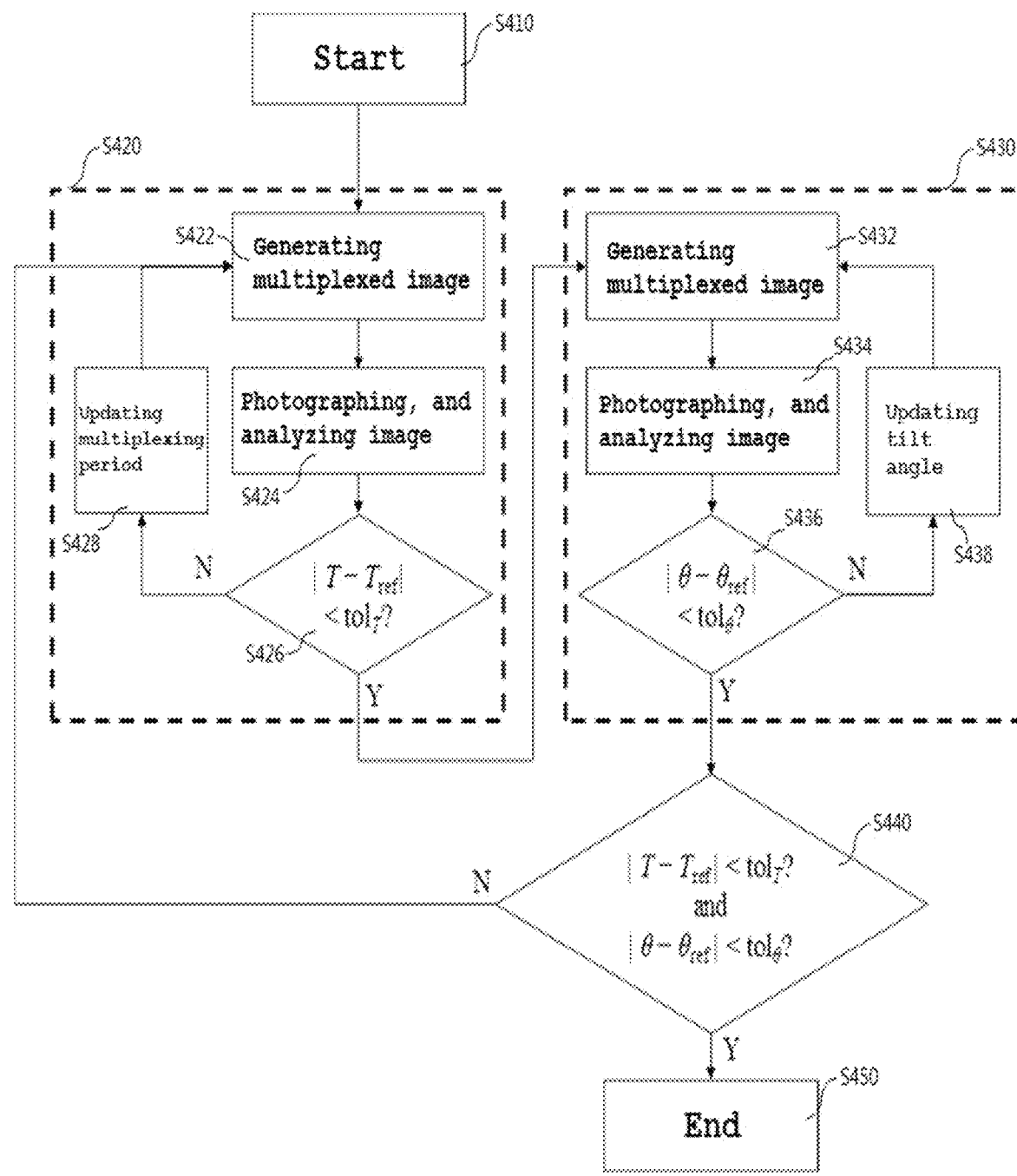
FIG. 4 is a diagram illustrating operation of an apparatus for correcting 3D image distortion according to an embodiment of the present disclosure.

FIG. 4 is a diagram illustrating operation of an apparatus for correcting 3D image distortion according to an embodiment of the present disclosure.

Referring to FIG. 4, the operation of the apparatus for correcting 3D image distortion roughly includes: updating the multiplexing period h at step S420; and updating the tilt angle α at step S430. For example, the method of correcting 3D image distortion may alternatively perform steps S420 and S430 in this order. Also, by performing steps S420 and S430, the method of correcting 3D image distortion may induce the horizontal period T of the stripe and the slope θ of the stripe, which are the characteristic values, to reach respective target values in ranges of respective error tolerance values and tolT and tolθ. Also, at each iteration of steps S420 and of S430, the method of correcting 3D image distortion may generate the multiplexed image first, may obtain the camera image from the image obtaining device, and may analyze the obtained camera image. Also, the method of correcting 3D image distortion may apply a root-finding algorithm at each of the steps S420 and S430. For example, a simple algorithm for finding a root of a univariate function, such as the bisection method, and the like, is applied using the fact that the characteristic value is monotonically increasing or monotonically decreasing by the change in multiplexing parameters and the true value is certainly present. Also, the method of correcting 3D image distortion may terminate steps S420 and S430, which are individual loops, with only a small number of iterations using the fact that 1/T and δh are linearly dependent in an approximate manner and tan(θ−π/2) and ΔA are linearly dependent.

In the meantime, referring to Equations 2 and 3, the horizontal period T of the stripe depends only on the error in the multiplexing period h while the slope θ of the stripe depends both on the error in the multiplexing period h and the error in the tilt angle α, so that in the method of correcting 3D image distortion, it is preferable to perform step S420 before step S430. In order for the tilt angle α obtained at step S430 to have a sufficiently accurate value, step S420 is performed first to reduce the error in the multiplexing period h. Also, the error in the tilt angle α may cause a slight variation of the characteristic value T, so that in the method of correcting 3D image distortion, the operations at steps S420 and S430 are repeated several times. However, in the method of correcting 3D image distortion, the order of the operations at steps S420 and S430 may be changed, that is, step S430 is performed first, and then step S420 is performed.

In the meantime, after completing the correction of the multiplexing period h and/or the tilt angle α, which are the multiplexing parameters, the apparatus for correcting 3D image distortion may perform a cyclic shift in batches on view numbers assigned to respective pixels. In this case, a global visual field shift takes place in such a manner that the observer positioned in front of the 3D image display device is able to view the central view.

In the meantime, main indicators of the accuracy of the algorithm are the error tolerances of the multiplexing period h and the tilt angle α that are directly related to the error tolerances of the characteristic values T and θ, respectively. Regarding the multiplexing period h, Equation 2 is used to obtain the approximate expression like Equation 4.

$$\frac{\Delta T}{T_{ref}} = \frac{T - T_{ref}}{T_{ref}} \approx \frac{T_{ref}}{h} \frac{\Delta h}{h}.$$ [Equation 4]

Referring to Equation 4, the error in the multiplexing period h is amplified by $T_{ref}/h$ and is expressed as the error in the characteristic value T. This magnification relation is also present with respect to the tilt angle α and the slope θ, the magnification at which the tilt angle α is amplified may be the same as the magnification at which h is amplified. That is, the error in the tilt angle α may be amplified by $T_{ref}/h$. As described above, using the phenomenon that the error is amplified, it is possible to achieve the accuracy that is higher than the accuracy of the length measurement, which is limited by the camera resolution. When the reference period $T_{ref}$ increases, the accuracy also increases, but the number of stripes in a single screen decreases, which results difficulty in extracting the characteristic value. Thus, considering this, the apparatus for correcting 3D image distortion may select an appropriate level of error magnification. Also, the apparatus for correcting 3D image distortion may increase the reference period gradually in the optimization process to improve the accuracy.

Figure 5:
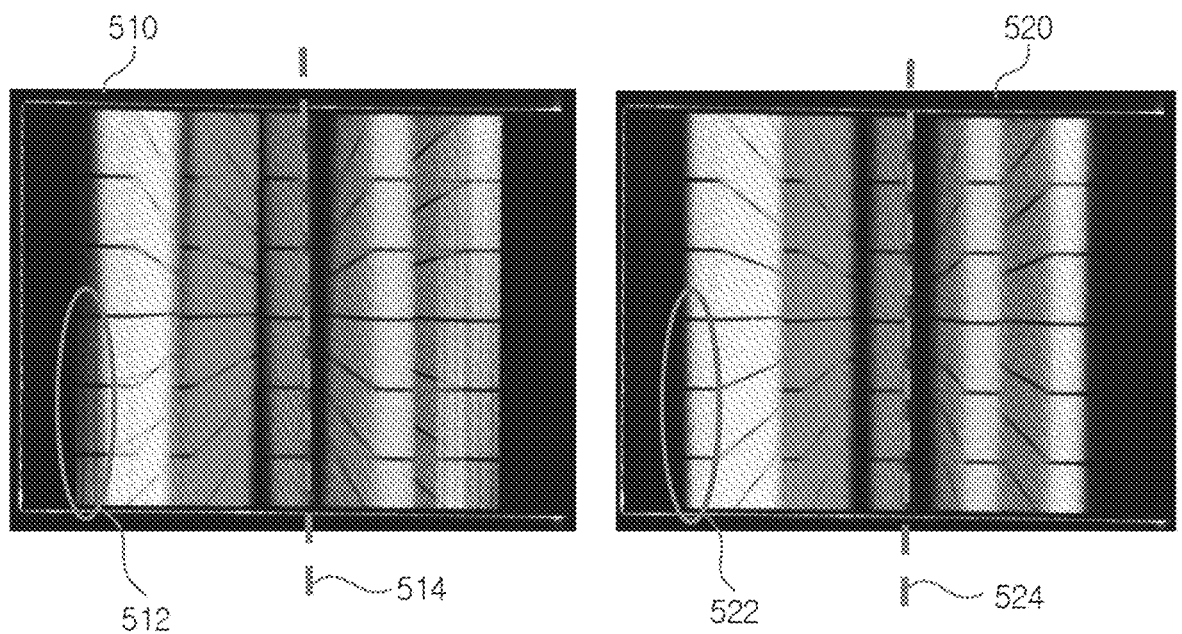
FIG. 5 is a diagram illustrating images before and after linear matching error correction according to an embodiment of the present disclosure.

FIG. 5 is a diagram illustrating images before and after linear matching error correction according to an embodiment of the present disclosure.

Referring to FIG. 5, a first image 510 that was not subjected to the method of correcting 3D image distortion of the present disclosure yet contained an image distortion phenomenon such as a double image 512 was viewed, the straight line was tilted 514 at different angles depending on the depth, and so on. On the other hand, compared with the first image 510, in a second image 520 that was subjected to the method of correcting 3D image distortion of the present disclosure, it was found that the afterimage of the double image disappeared 522 and the phenomenon that the straight line was tilted was removed 524.

Figure 6:
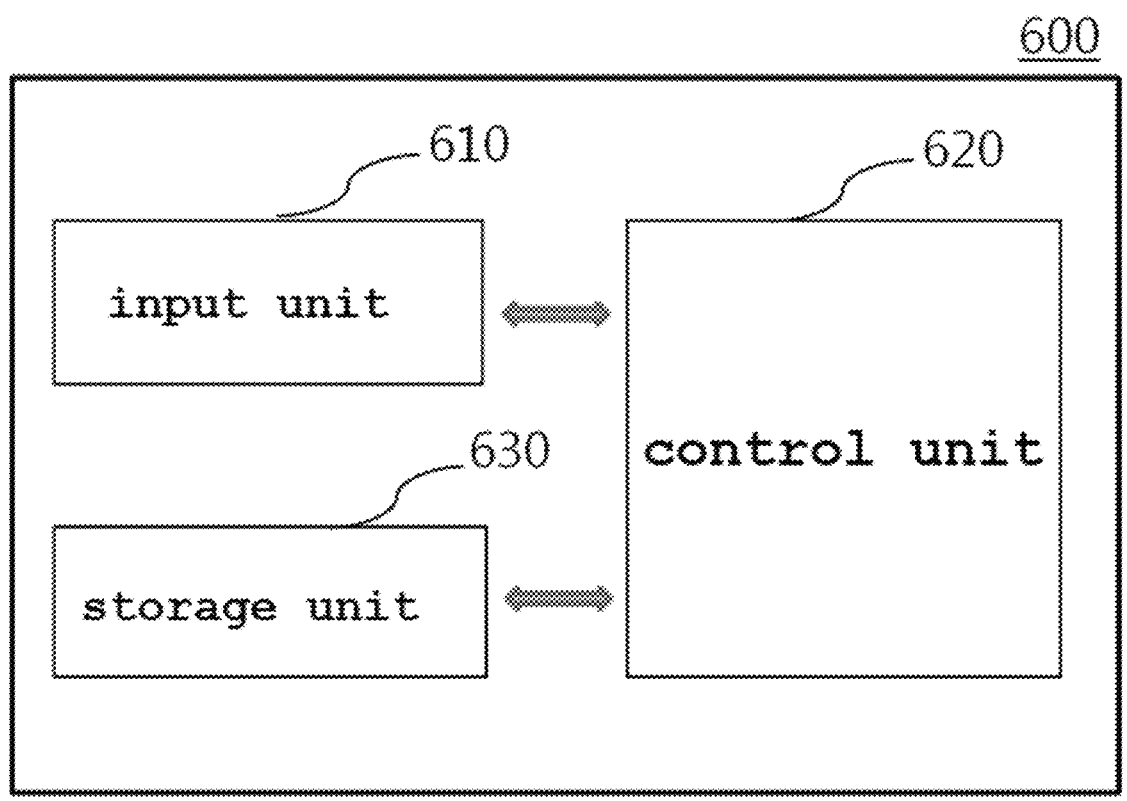
FIG. 6 is a diagram illustrating a configuration of an apparatus for correcting 3D image distortion according to an embodiment of the present disclosure.

FIG. 6 is a diagram illustrating a configuration of an apparatus for correcting 3D image distortion according to an embodiment of the present disclosure.

Referring to FIG. 6, the apparatus 600 for correcting 3D image distortion may include an input unit 610, a control unit 620, and/or a storage unit 630. However, only some constituents necessary to describe the embodiment are illustrated, the constituents included in the apparatus 600 for correcting 3D image distortion are not limited to the above-described example. For example, two or more constituent parts may be realized in a single constituent part. Alternatively, an operation performed in a single constituent part may be realized in such a manner as to be divided and performed in two or more constituent parts. Also, some constituent parts may be omitted or additional constituent parts may be added.

An input unit 610 receives image sequences, text, audio (for example, voice, music, and the like) and additional information (for example, EPG, and the like) from the outside of the apparatus 600 for correcting 3D image distortion under control by a control unit 620.

For example, the input unit 610 may receive the input image containing a predetermined first pattern. The view image group may include one or more view images, and the view image may contain a second pattern. The view images may have a cyclic characteristic that gradual alteration takes place as the view moves and when additional alteration takes place at the last view by the distance corresponding to one view interval, returning back to the first view image takes place. For example, the view image group may include n (n is a positive integer) view images, and the view images are obtained in sequence by altering the second pattern corresponding to the view interval. When the n-th view image is altered by one view interval, the first view image is obtained. Also, the view image group and the multiplexing parameters may be used to generate the multiplexed image. The second pattern may mean a predetermined pattern shape contained in the view image to measure the linear matching error. Also, the first pattern may be an alteration in shape of the second pattern. For example, when viewing the multiplexed image displayed on the display panel via the optical layer, the second pattern is altered due to the mismatch between the optical layer and the display, or the like. Also, for example, the type of the alteration may be a combination of enlargement, reduction, rotation, and the like, but is not limited thereto.

The control unit 620 controls overall operation of the apparatus 600 for correcting 3D image distortion, the flow of signals between internal constituents of the apparatus 600 for correcting 3D image distortion, and performs data processing. When there is input from the user or when a preset and stored condition is satisfied, the control unit 620 uses various types of data stored in a storage unit 630 and also executes various applications.

For example, the control unit 620 may extract the characteristic value related to the pattern contained in the input image from the input image and may update the input image on the basis of the extracted characteristic value. For example, the characteristic value may be the length or slope of the first pattern.

Further, for example, the control unit 620 may extract the characteristic value related to the first pattern by using the corner search algorithm, and the Homography transformation or Hough transform-based line search algorithm.

Further, for example, the control unit 620 may determine whether the characteristic value is present within the preset range and may update the multiplexing parameters for the view image depending on the result of the determination. For example, the multiplexing parameters may include the information on the cross-eyed placement period or on the cross-eyed placement direction of the view image. The information on the cross-eyed placement period or on the cross-eyed placement direction of the view image may be information required to obtain the 3D image by combining the view images, for example, placing the view images in a cross-eyed manner.

Further, for example, the control unit 620 may determine whether the characteristic value is present within the preset range and may update the information on the cross-eyed placement period first depending on the result of the determination, and then may update the information on the cross-eyed placement direction.

The storage unit 630 may store various types of data, program, or application for driving and controlling the apparatus 600 for correcting 3D image distortion under control by the control unit 620.

For example, the storage unit 630 may store the characteristic value related to the first pattern that is included in the input image.

According to the present disclosure, the apparatus and the method of correcting 3D image distortion are provided.

Also, according to the present disclosure, the apparatus and the method of correcting 3D image distortion on the basis of the linear matching error correction technique are provided.

Also, according to the present disclosure, it is possible to overcome the problem that the conventional linear matching error correction technique is unable to guarantee the sufficient accuracy for the 3D display device in practice.

Also, according to the present disclosure, it is possible to provide the test pattern image that enables the matching state between the display panel and the optical layer of the 3D image display device to be precisely measured.

Also, according to the present disclosure, it is possible to provide the method of determining the optimum matching state by continuously monitoring the matching state between the display panel and the optical layer.

Also, according to the present disclosure, there is provided the method of assessing the accuracy of matching error estimation in a quantitative manner and of performing linear matching error correction with the high accuracy of the display device in practice through repetitive assessment of the matching state.

Also, the present disclosure is distinguished from the conventional technology that the accuracy is verified only in the simulation environment or the relatively low accuracy is provided, in that the accuracy is assessed and the performance is verified in the practical experimental environment.

Although exemplary methods of the present disclosure are described as a series of operation steps for clarity of a description, the present disclosure is not limited to the sequence or order of the operation steps described above. The operation steps may be simultaneously performed, or may be performed sequentially but in different order. In order to implement the method of the present disclosure, additional operation steps may be added and/or existing operation steps may be eliminated or substituted.

Various embodiments of the present disclosure are not presented to describe all of available combinations but are presented to describe only representative combinations. Steps or elements in various embodiments may be separately used or may be used in combination.

In addition, various embodiments of the present disclosure may be embodied in the form of hardware, firmware, software, or a combination thereof. When the present disclosure is embodied in a hardware component, it may be, for example, an application specific integrated circuit (ASIC), a digital signal processor (DSP), a digital signal processing device (DSPD), a programmable logic device (PLD), a field programmable gate array (FPGA), a general processor, a controller, a microcontroller, a microprocessor, etc.

The scope of the present disclosure includes software or machine-executable instructions (for example, operating systems (OS), applications, firmware, programs) that enable methods of various embodiments to be executed in an apparatus or on a computer, and a non-transitory computer-readable medium storing such software or machine-executable instructions so that the software or instructions can be executed in an apparatus or on a computer.

What is claimed is:

1. A method of correcting 3D image distortion, the method comprising:
receiving an input image that contains a first pattern;

extracting a characteristic value related to the first pattern from the input image;
generating a multiplexed image using a view image group and a multiplexing parameter, then display the multiplexed image on a display panel; and
updating the multiplexing parameter and the multiplexed image based on the extracted characteristic value.

2. The method of claim 1, wherein the view image group includes at least one view image,
the view image contains a second pattern, the second pattern configured to be predetermined, and
the first pattern is an alteration in shape of the second pattern.

3. The method of claim 1, wherein the characteristic value is at least one of a length and a slope of the first pattern.

4. The method of claim 2,
wherein the view image group includes n (n is a positive integer) view images, the view images are obtained in sequence by altering the second pattern corresponding to a view interval, and
when the n-th view image is altered by one view interval, the first view image is obtained.

5. The method of claim 2, the updating of the multiplexed image comprises:
determining whether the characteristic value is present within a preset range; and
updating the multiplexing parameter for the view image depending on the result of the determination.

6. The method of claim 5, wherein the multiplexing parameter is at least one among information on a cross-eyed placement period and information on a cross-eyed placement direction of the view image.

7. The method of claim 6, wherein the multiplexing parameter includes the information on the cross-eyed placement period and the information on the cross-eyed placement direction, the updating of the multiplexing parameter comprises:
updating the information on the cross-eyed placement period depending on the result of the determination; and
updating the information on the cross-eyed placement direction depending on the result of the determination.

8. An apparatus for correcting 3D image distortion, the apparatus comprising:
an input unit receiving an input image that contains a first pattern;
a storage unit storing a characteristic value related to the first pattern; and
a control unit extracting the characteristic value from the input image and generating a multiplexed image using a view image group and a multiplexing parameter, then display the multiplexed image on a display panel and updating the multiplexing parameter and the multiplexed image based on the extracted characteristic value.

9. The apparatus of claim 8, wherein the view image group includes at least one view image,
the view image contains a second pattern, the second pattern configured to be predetermined, and
the first pattern is an alteration in shape of the second pattern.

10. The apparatus of claim 8, wherein the characteristic value is at least one of a length and a slope of the first pattern.

11. The apparatus of claim 9, wherein the view image group includes n (n is a positive integer) view images, the view images are obtained in sequence by altering the second pattern corresponding to a view interval, and when the n-th view image is altered by one view interval, the first view image is obtained.

12. The apparatus of claim 9, wherein the control unit is configured to:
determine whether the characteristic value is present within a preset range; and
update the multiplexing parameter for the view image depending on the result of the determination.

13. The apparatus of claim 12, wherein the multiplexing parameter is at least one among information on a cross-eyed placement period and information on a cross-eyed placement direction of the view image.

14. The apparatus of claim 13,
wherein the multiplexing parameter includes the information on the cross-eyed placement period and the information on the cross-eyed placement direction,
the control unit is configured to:
update the information on the cross-eyed placement period depending on the result of the determination; and
update the information on the cross-eyed placement direction depending on the result of the determination.

* * * * *